(12) United States Patent
Sprenger

(10) Patent No.: US 11,052,788 B2
(45) Date of Patent: Jul. 6, 2021

(54) LONGITUDINAL ADJUSTER AND VEHICLE SEAT

(71) Applicant: ADIENT ENGINEERING AND IP GMBH, Burscheid (DE)

(72) Inventor: Erik Sprenger, Wermelskirchen (DE)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/636,677

(22) PCT Filed: Aug. 6, 2018

(86) PCT No.: PCT/EP2018/071241
§ 371 (c)(1),
(2) Date: Feb. 5, 2020

(87) PCT Pub. No.: WO2019/030160
PCT Pub. Date: Feb. 14, 2019

(65) Prior Publication Data
US 2020/0156507 A1 May 21, 2020

(30) Foreign Application Priority Data

Aug. 8, 2017 (DE) ...................... 10 2017 213 782.7
Oct. 17, 2017 (DE) ...................... 10 2017 218 492.2

(51) Int. Cl.
*B60N 2/06* (2006.01)
*B60N 2/02* (2006.01)

(52) U.S. Cl.
CPC ........... *B60N 2/067* (2013.01); *B60N 2/0232* (2013.01); *B60N 2/0276* (2013.01); *B60N 2002/0236* (2013.01)

(58) Field of Classification Search
CPC . B60N 2/067; B60N 2/06; B60N 2/04; B60N 2/0232; B60N 2/0224; B60N 2/0276; B60N 2002/0236
(Continued)

(56) References Cited

U.S. PATENT DOCUMENTS 7,303,223 B2   12/2007   Nakamura et al.
8,061,756 B2   11/2011   Kimata et al.
(Continued)

FOREIGN PATENT DOCUMENTS

DE   20022580 U1   11/2001
DE   10056443 A1    5/2002
(Continued)

OTHER PUBLICATIONS

German priority document DE 10 2017 218 492 A1 Cover Page, issued Feb. 14, 2019, with German Search Report citation listing, German Patent and Trademark office, Germany.
(Continued)

*Primary Examiner* — Mark R Wendell
(74) *Attorney, Agent, or Firm* — Marshall & Melhorn, LLC

(57) ABSTRACT

A longitudinal adjuster may have a first transverse locking bar accommodated in a slot of a first seat rail. A spindle may be guided through an opening of the first transverse bar in a contact-free manner. At a distance from the first transverse locking bar toward the front, a shoulder of the spindle is arranged. In reaction to a specified action of force, the first transverse locking bar is clamped between the first seat rail and the shoulder. As a result, a force from the first seat rail via the first transverse locking bar, the shoulder, the spindle, and the spindle nut can be diverted to the second seat rail.

9 Claims, 6 Drawing Sheets

Figure 1:
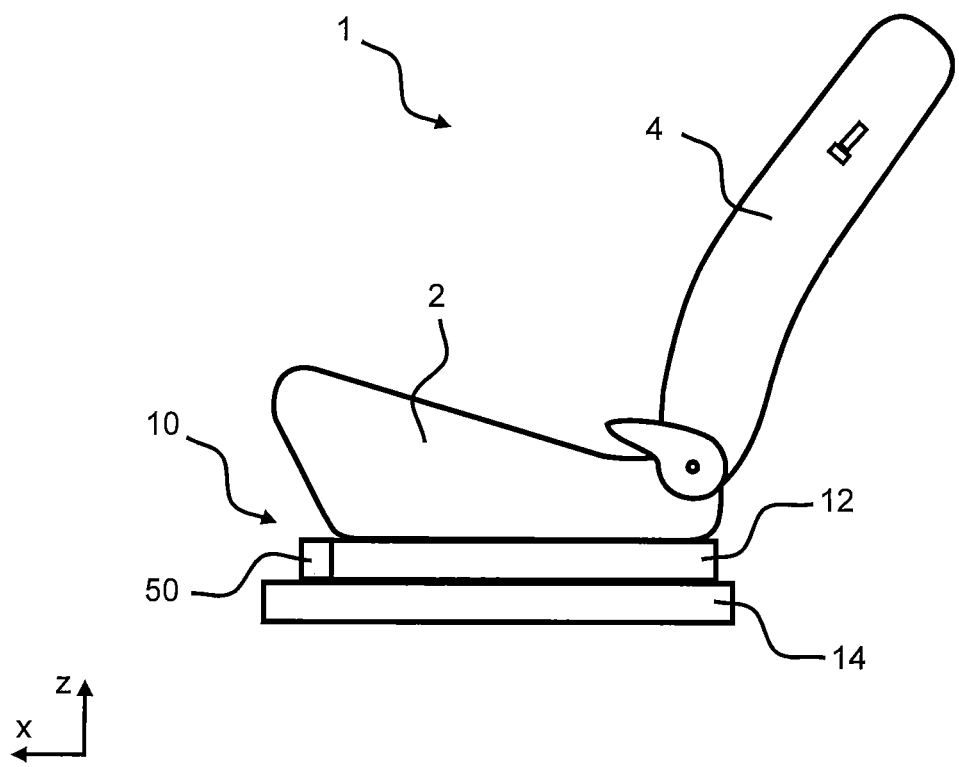

(58) Field of Classification Search
USPC .................................................. 297/216.16
See application file for complete search history.

(56) References Cited

U.S. PATENT DOCUMENTS

| | | | |
|---|---|---|---|
| 10,144,310 B1* | 12/2018 | Ferenc | B60N 2/067 |
| 2005/0253036 A1 | 11/2005 | Li et al. | |
| 2011/0139954 A1* | 6/2011 | Ruess | B60N 2/067 |
| | | | 248/429 |
| 2011/0284718 A1* | 11/2011 | Kimura | F16F 15/08 |
| | | | 248/560 |
| 2017/0009870 A1* | 1/2017 | Hoffmann | B60N 2/067 |
| 2017/0166090 A1* | 6/2017 | Elsarelli | B60N 2/0722 |
| 2018/0065507 A1* | 3/2018 | Napau | B60N 2/06 |
| 2019/0232833 A1* | 8/2019 | Emrich | B60N 2/43 |
| 2019/0275914 A1* | 9/2019 | Schuermann | F16H 25/20 |
| 2019/0389332 A1* | 12/2019 | Flick | B60N 2/08 |
| 2020/0039389 A1* | 2/2020 | Stemmer | B60N 2/06 |
| 2020/0130538 A1* | 4/2020 | Emrich | B60N 2/0705 |

FOREIGN PATENT DOCUMENTS

| | | |
|---|---|---|
| DE | 10062217 A1 | 7/2002 |
| DE | 102005023095 A1 | 12/2005 |
| DE | 102006000193 A1 | 10/2006 |
| DE | 102006055267 A1 | 5/2008 |
| JP | 2001239861 A | 9/2001 |
| JP | 2002240600 A | 8/2002 |
| JP | 2006335153 A | 12/2006 |
| JP | 2008056003 A | 3/2008 |
| JP | 2010047090 A | 3/2010 |

OTHER PUBLICATIONS

European Patent Office International Search Report with Written Opinion, issued in PCT/EP2018/071241, dated Nov. 5, 2018, 13 pages, European Patent Office, Rijswijk, Netherlands.

* cited by examiner

LONGITUDINAL ADJUSTER AND VEHICLE SEAT

The invention relates to a longitudinal adjuster, in particular for a vehicle seat, the longitudinal adjuster having at least one pair of rails which is formed from a first seat rail and a second seat rail which is displaceable in the longitudinal direction relative to the first seat rail, wherein the seat rails mutually engage around each other so as to form an inner channel, wherein a spindle nut mounted with the second seat rail and a spindle operatively connected to the spindle nut are arranged in the inner channel, wherein a gearing which can be driven by means of a motor and interacts with the spindle is arranged at a front end of the first seat rail, wherein the spindle is mounted at a front end portion of the spindle in the gearing and at a rear end portion of the spindle in a rotary bearing of the first seat rail. The invention furthermore relates to a vehicle seat.

PRIOR ART

DE 10 2005 023 095 A1 discloses a drive device of the type in question for a motor vehicle seat in a sliding device.

The drive device for use with a motor vehicle seat sliding device comprises fixed and moveable rail parts which fit together and can be moved between a front position and a rear position. The drive device comprises an extended spindle, a spindle nut, a gearing and an installation device. The spindle defines a spindle axis and has a spindle thread extending in the longitudinal direction. The spindle nut can be fastened securely on a first rail part and has an internal thread which can engage in the spindle thread. The gearing can be mounted on another rail part in each case and selectively rotates the spindle about the spindle axis. The spindle of the drive device is provided with a spindle wheel which, in the mounted state of the drive device, extends outward through spindle wheel openings of the moveable rail part.

Problem

The invention is based on the problem of improving a longitudinal adjuster of the type mentioned at the beginning, in particular a longitudinal adjuster which permits a reduced number of openings, in particular in the surface directed upward in the vertical direction, and of providing a corresponding vehicle seat.

Solution

This problem is solved according to the invention by a longitudinal adjuster, in particular for a vehicle seat, the longitudinal adjuster having at least one pair of rails which is formed from a first seat rail and a second seat rail which is displaceable in the longitudinal direction relative to the first seat rail, wherein the seat rails mutually engage around each other so as to form an inner channel, wherein a spindle nut mounted with the second seat rail and a spindle operatively connected to the spindle nut are arranged in the inner channel, wherein a gearing which can be driven by means of a motor and interacts with the spindle is arranged at a front end of the first seat rail, wherein the spindle is mounted at a front end portion of the spindle in the gearing and at a rear end portion of the spindle in a rotary bearing of the first seat rail, wherein a first transverse bar is accommodated in a slot of the first seat rail upstream of the spindle nut in the longitudinal direction, wherein the spindle is guided through an opening of the first transverse bar in a contact-free manner, in particular with an encircling gap being formed, wherein a step of the spindle is arranged spaced apart forward in the longitudinal direction with respect to the first transverse bar, wherein, in reaction to a predetermined action of force, for example in the event of a crash, in particular by displacement of the first seat rail, the first transverse bar is clamped between the first seat rail and the step and a force from the first seat rail can thereby be diverted via the first transverse bar, the step, the spindle and the spindle nut to the second seat rail.

Owing to the fact that a first transverse bar is accommodated in a slot of the first seat rail upstream of the spindle nut in the longitudinal direction, furthermore the spindle is guided through an opening of the first transverse bar in a contact-free manner, in particular with an encircling gap being formed, and a step of the spindle is arranged spaced apart forward in the longitudinal direction with respect to the first transverse bar, metallic noises, which are annoying during normal operation, due to undesirable contact between two components moving relative to each other can be avoided.

Owing to the fact that, furthermore, in reaction to a predetermined action of force, for example in the event of a crash, in particular by displacement of the first seat rail relative to the spindle, the first transverse bar is clamped between the first seat rail and the step and a force from the first seat rail can thereby be diverted via the first transverse bar, the step, the spindle and the spindle nut to the second seat rail, it is made possible for a crash load from a vehicle seat mounted on the longitudinal adjuster to be able to be reliably conducted into a vehicle structure. A crash load is conventionally a force which, in the event of a crash, is increased many times in comparison to a force acting on the longitudinal adjuster during normal operation.

Advantageous refinements which can be used individually or in combination with one another are the subject matter of the dependent claims.

The step of the spindle can be rotatable completely within the inner channel. The step of the spindle can be manufactured integrally with the spindle. The step of the spindle can be a nut which is screwed onto the spindle. The nut can have an internal thread interacting with an external thread of the spindle. The nut can be fixed to the spindle, in particular can be fixed by means of an adhesive or by means of a welding process.

The rotary bearing supporting the rear end portion of the spindle can be a second transverse bar. The second transverse bar can have a bearing opening for receiving a bearing bushing. The bearing bushing can be fixed in a rotationally secured manner in the bearing opening. The bearing bushing can be manufactured from a plastic.

A further step, in particular a stepped nut, can be arranged on the rear end portion of the spindle, which step is mounted rotatably by means of a cylindrical first portion in a bearing bushing and is arranged spaced apart by a radially enlarged second portion from the second transverse bar. The further step or the stepped nut can have an internal thread which interacts with the external thread of the spindle. The further step or the stepped nut can be screwed onto the spindle. The further step or the stepped nut can be fixed to the spindle, in particular can be fixed by means of an adhesive or by means of a welding process.

In reaction to a predetermined action of force, in particular in the event of a rear impact, the second transverse bar can be clamped between the first seat rail and the further step or the second portion of the stepped nut, in particular by displacement of the first seat rail rearward relative to the spindle, and a force from the first seat rail can thereby be diverted via the second transverse bar, the stepped nut, the spindle and the spindle nut to the second seat rail.

The first transverse bar and/or the second transverse bar can be of flat configuration. The first transverse bar and/or the second transverse bar can be fastened at a contact surface directed upward in the vertical direction to the second seat rail, preferably by means of projection welding. The first transverse bar and/or the second transverse bar can be accommodated with play parallel to the longitudinal direction in a second slot of the first seat rail. The first transverse bar can be accommodated in a first slot of the first seat rail, with a gap being formed, in particular a gap on both sides, parallel to the longitudinal direction. The second transverse bar can be accommodated in a second slot of the first seat rail with a gap being formed, in particular a gap on both sides, parallel to the longitudinal direction.

The first transverse bar and/or the second transverse bar can have projections which project laterally out of the respective slot of the second seat rail parallel to the transverse direction. The projections of the first and/or second transverse bar, which projections project out of the second seat rail, can be spaced apart from the first seat rail. The projections of the first and/or second transverse bar, which projections can be brought into contact with the second seat rail in the event of the first seat rail being loaded upward in the vertical direction, can have a geometry by means of which those portions of the second seat rail which are in contact with the geometry can be conducted past the projections. Those portions of the second seat rail which are in contact with the geometry are bent outward here and counteract what is referred to as a peeling effect, in particular bending up of the second seat rail. Furthermore, it is prevented, by said portions of the second seat rail being conducted past, that the welded connection of the transverse bars with respect to the first seat rail is subjected to too strong a tensile loading, and therefore tearing off of the transverse bars from the first seat rail is prevented.

The object is furthermore achieved according to the invention by a vehicle seat having a previously described longitudinal adjuster.

FIGURES AND EMBODIMENTS OF THE INVENTION

Before refinements of the invention are described in greater detail below using drawings, it should first of all be noted that the invention is not restricted to the described components or the described method steps. Furthermore, the terminology which is used is also not of a restrictive nature, but rather has merely an exemplary character. If the singular is used below in the description and the claims, the plural is included in each case, insofar as the context does not explicitly rule this out.

Figure 2:
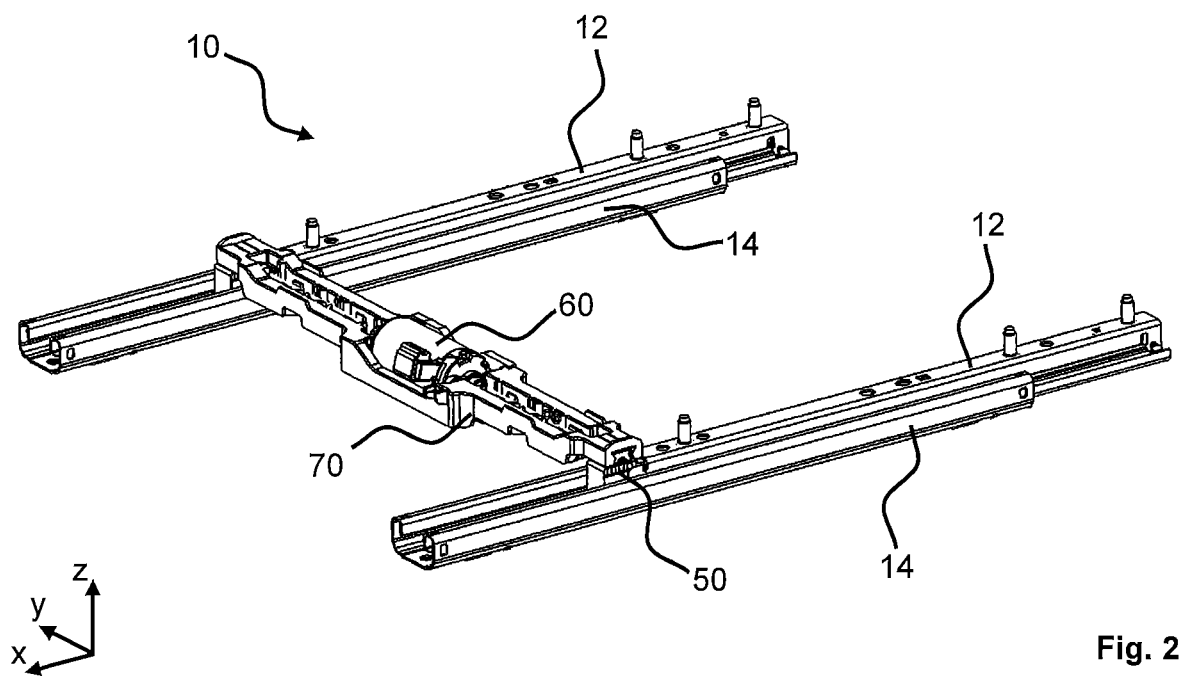
Figure 7:
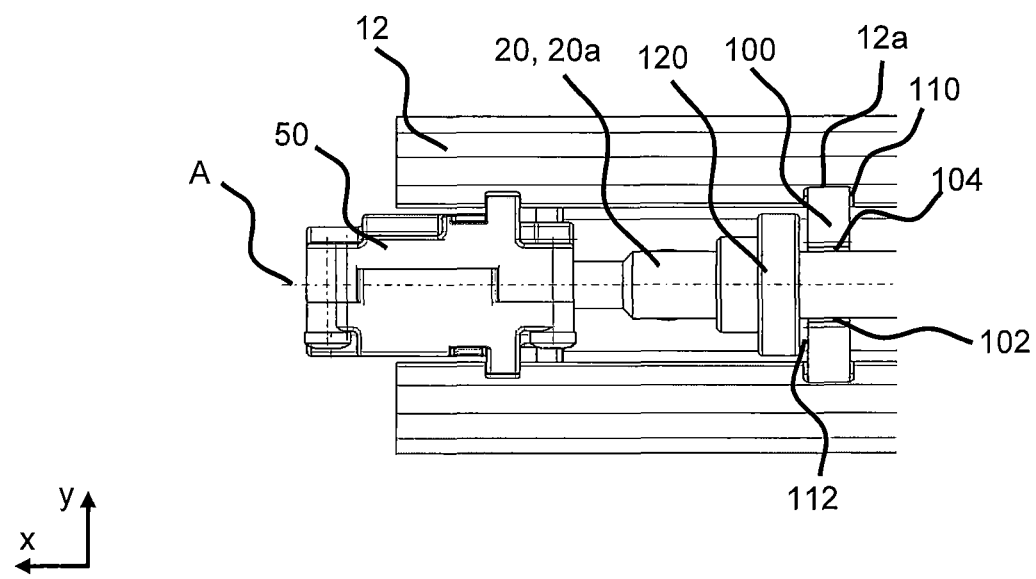
Figure 8:
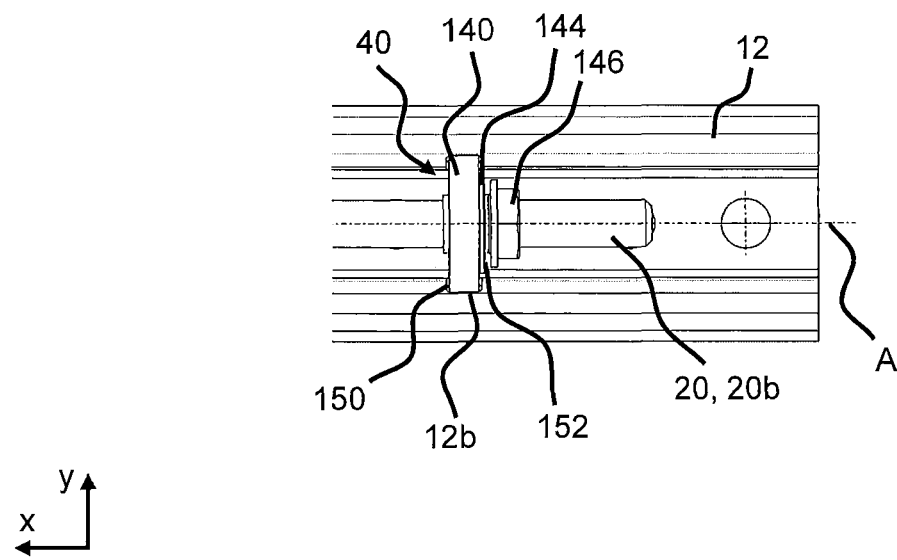
Figure 10:
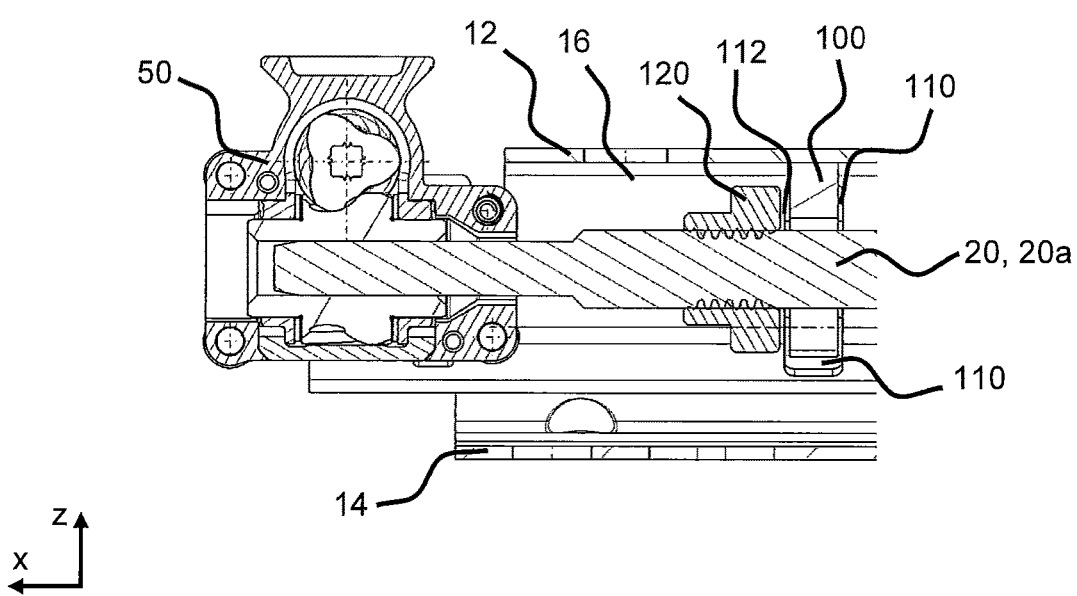
Figure 11:
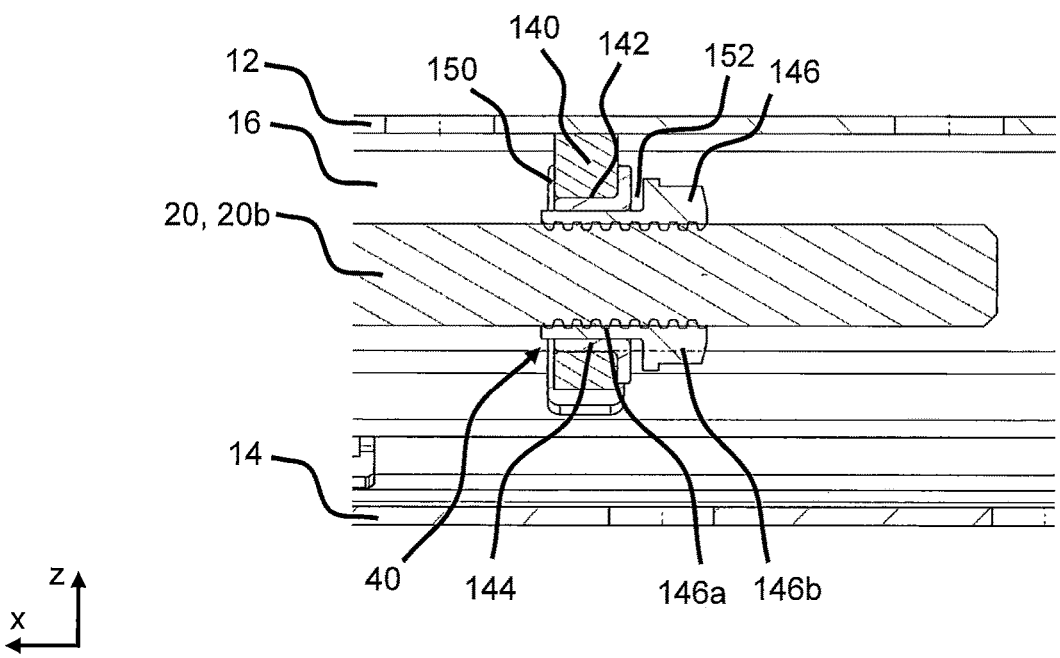

The invention is explained in more detail below with reference to an advantageous exemplary embodiment which is illustrated in the figures. However, the invention is not restricted to said exemplary embodiment. In the figures:

FIG. 1: shows a vehicle seat according to the invention,

FIG. 2: shows a longitudinal adjuster according to the invention of the vehicle seat from FIG. 1, FIG. 3: shows a perspective view of a pair of rails of the longitudinal adjuster from FIG. 2, FIG. 4: shows a view from the front of the pair of rails of FIG. 3, FIG. 5: shows a view from the rear of the pair of rails from FIG. 3, FIG. 6: shows a view from below of a first seat rail with components arranged therein, FIG. 7: shows an enlarged view of a front portion of the illustration of FIG. 6, FIG. 8: shows an enlarged view of a rear portion of the illustration of FIG. 6, FIG. 9: shows an illustration of a longitudinal section of the pair of rails from FIG. 3, FIG. 10: shows an enlarged view of a front portion of the illustration of FIG. 9, FIG. 11: shows an enlarged view of a rear portion of the illustration of FIG. 9, FIG. 12: shows an illustration of a cross section of the pair of rails from FIG. 3 through a first transverse bar, and FIG. 13: shows an illustration of a cross section of the pair of rails from FIG. 3 through a step.

A vehicle seat 1 which is illustrated schematically in FIG. 1 will be described below using three spatial directions running perpendicularly to one another. With a vehicle seat 1 installed in the vehicle, a longitudinal direction x runs substantially horizontally and preferably parallel to a vehicle longitudinal direction which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. With a vehicle seat 1 installed in the vehicle, the vertical direction z runs parallel to the vehicle vertical axis.

The position specifications and direction specifications used, such as for example front, rear, top and bottom, relate to a viewing direction of an occupant seated in the vehicle seat 1 in a normal seat position, wherein the vehicle seat 1 is installed in the vehicle and is oriented in a use position suitable for passenger transport, with an upright backrest 4 and in the direction of travel as customary. However, the vehicle seat 1 may also be installed in a different orientation, for example transversally with respect to the direction of travel.

The vehicle seat 1 shown in FIG. 1 for a motor vehicle has a seat part 2 and a backrest 4 which is adjustable in its inclination relative to the seat part 2. The inclination of the backrest 4 can be adjustable, for example, by means of a latching fitting or a geared fitting. The vehicle seat 1 is mounted on a longitudinal adjuster 10 for adjusting a longitudinal position of the seat.

FIG. 2 shows the longitudinal adjuster 10 according to the invention of the vehicle seat 1 from FIG. 1. The longitudinal adjuster 10 has at least one pair of rails, in the present case two pairs of rails. The pairs of rails are each formed from a first seat rail 12, in particular for connecting to a seat structure, and a second seat rail 14, in particular for connecting to a vehicle structure. The seat rails 12, 14 of the pair of rails are displaceable in the longitudinal direction x relative to each other and mutually engage around each other so as to form an inner channel 16. A spindle nut 30 mounted on the second seat rail 14 and a spindle 20 operatively connected to the spindle nut 30 are arranged in the inner channel 16. The spindle 20 extends along a spindle axis A parallel to the longitudinal direction x. A gearing 50 which can be driven by means of a motor 60 and interacts with the spindle 20 is arranged at a front end of the first seat rail 12. The motor 60 is held on a motor carrier 70, which is mounted between the two gearings 50 of the respective pairs of rails, and drives the two gearings 50 by means of a shaft, not illustrated in FIG. 2.

Figure 3:
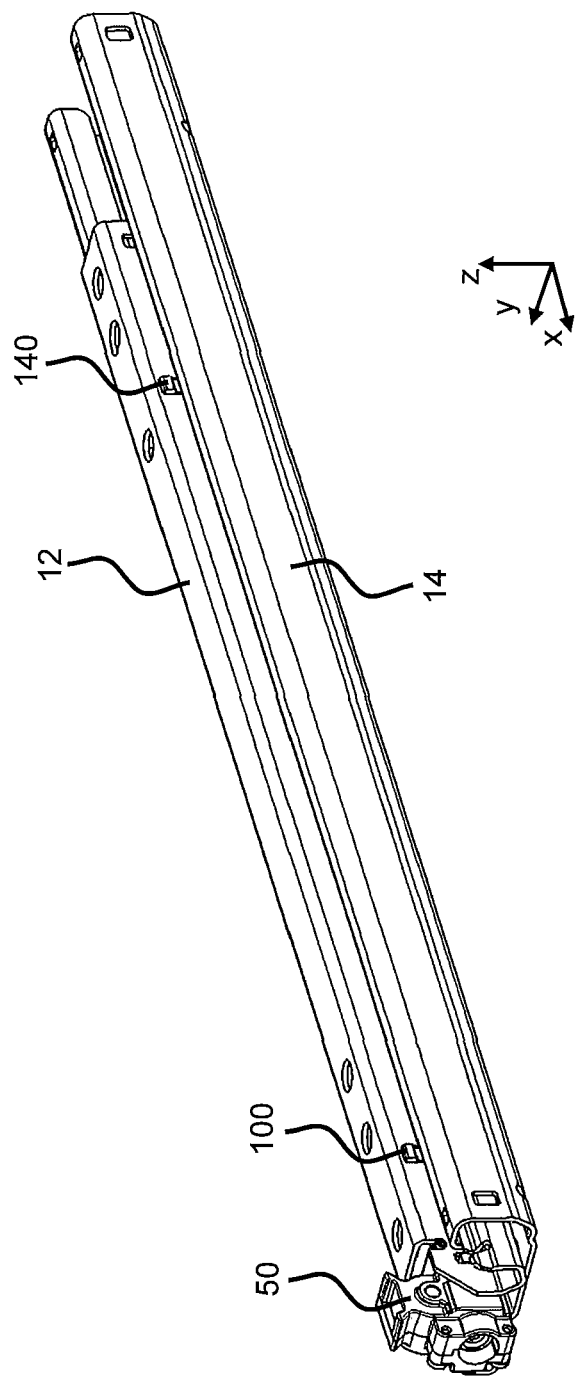

FIG. 3 shows one of the pairs of rails of the longitudinal adjuster 10 from FIG. 2.

Figure 4:
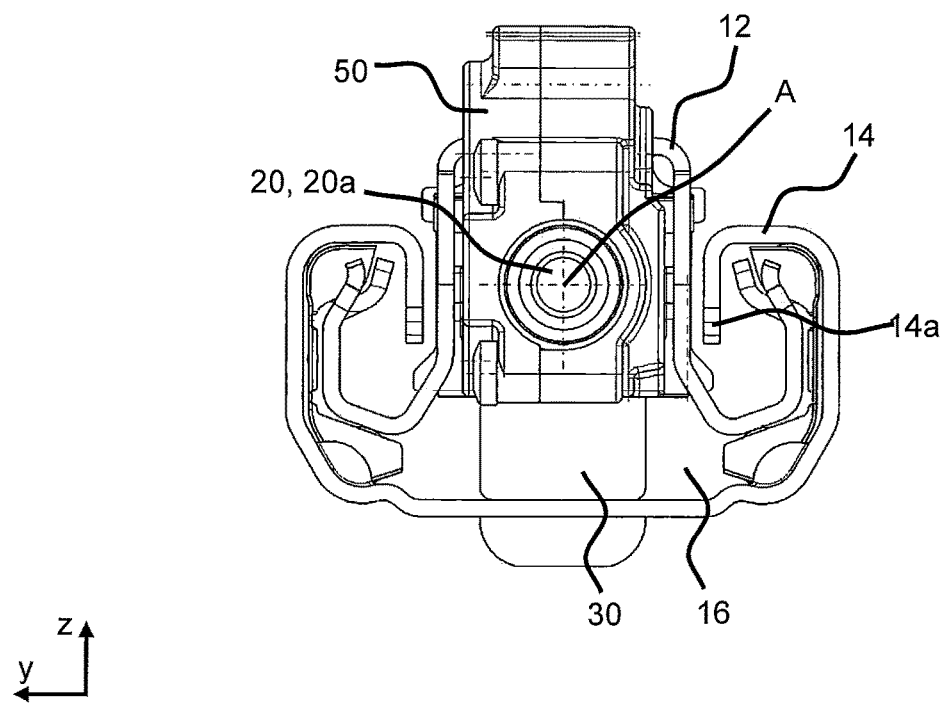

FIG. 4 shows a view from the front of the pair of rails from FIG. 3. The gearing 50 supports a front end portion 20a of the spindle 20.

Figure 5:
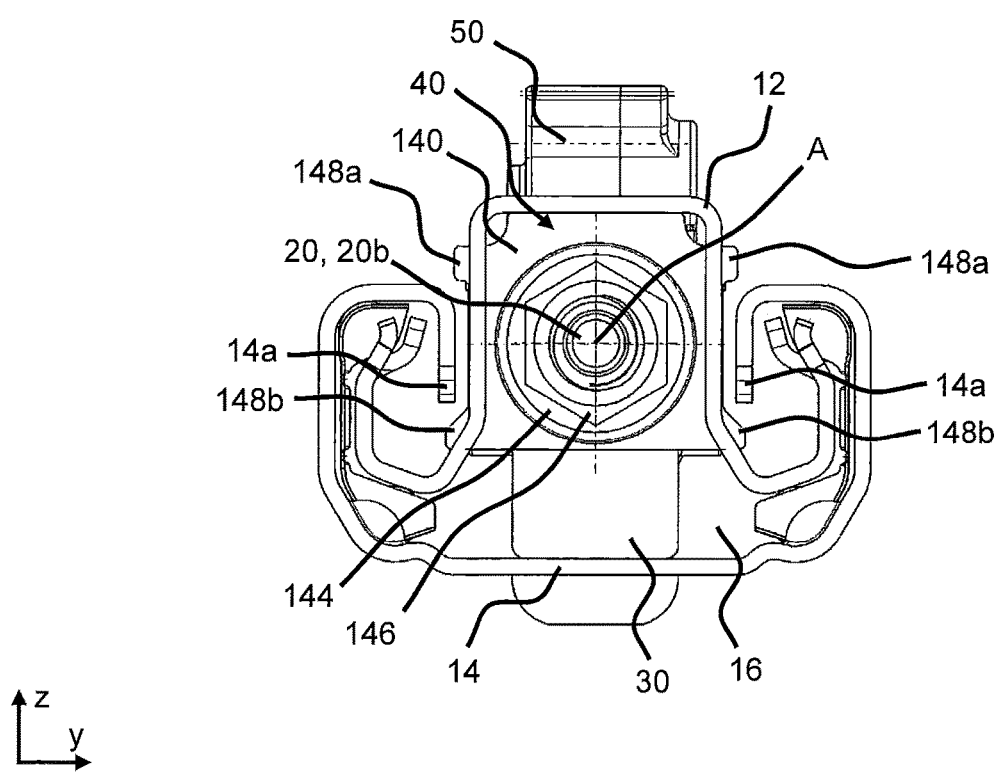

FIG. 5 shows a view from the rear of the pair of rails from FIG. 3. A rear end portion 20b of the spindle 20 is mounted in a rotary bearing 40 of the first seat rail 12.

Figure 6:
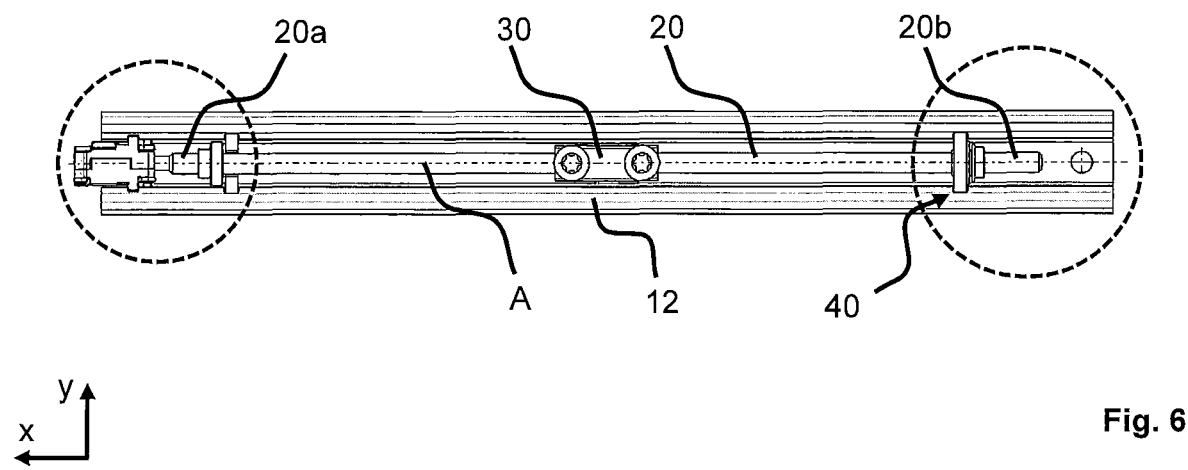

FIG. 6 shows a view from below of the first seat rail 12 with components arranged therein. FIGS. 7 and 8 respectively show an enlarged view of a front and rear portion of the first seat rail 12 from FIG. 6. In the state illustrated here, the spindle nut 30 is arranged centrally along the length of the spindle 20. By rotation of the spindle 20 about the spindle axis A, the spindle nut 30 is screwed along an external thread of the spindle 20 in or counter to the longitudinal direction x depending on the direction of rotation.

A first transverse bar 100 is accommodated in a first slot 12a of the first seat rail 12 upstream of the spindle nut 30 in the longitudinal direction x. The first transverse bar 100 has an opening 102. The spindle 20 is guided through the opening 102 of the first transverse bar 100 in a contact-free manner, in particular with an encircling gap 104 being formed. A step 120 of the spindle 20 is arranged forward in the longitudinal direction x and spaced apart with respect to the first transverse bar 100. According to the preferred exemplary embodiment illustrated, the step 120 is a nut 120 which can be screwed onto the external thread of the spindle 20 and has an internal thread co-operating with the external thread of the spindle 20. The step 120 is described in general below with reference to the nut 120 which is illustrated. In the mounted state, the nut 120 is preferably connected, in particular adhesively bonded or welded, to the spindle 20 for rotation therewith. The nut 120 which is fastened on the spindle 20 is rotatable completely within the inner channel 16. By this means, no recesses or openings whatsoever in the first seat rail 12 are necessary around the nut 120 and the stability of the seat rail 12 is less impaired by recesses or openings. The nut 120 has a circular-cylindrical outer contour.

By a predetermined action of force, as occurs, for example, in the event of a head-on crash, being exceeded, the first seat rail 12 is displaced forward relative to the spindle 20 in such a manner that the first seat rail 12 first of all carries along the first transverse bar 100, which is fixed thereon, in its movement in the longitudinal direction x until the gap 112 between the first transverse bar 100 and the nut 120 is closed by contact between the first transverse bar 100 and the nut 120. Subsequently, the transverse bar 100 is deformed in its connecting region to the first seat rail 12 in such a manner that the gap 110 between the first transverse bar 100 and the rear edge of the first slot 12a closes by the rear edge, as viewed in the longitudinal direction x, of the first slot 12a entering into contact with the first transverse bar 100. By this means, in reaction to a predetermined action of force, for example in the event of a crash, the first transverse bar 100 is clamped between the first seat rail 12 and the nut 120, in particular by displacement of the first seat rail 12 relative to the spindle 20 because of deformation, and a force from the first seat rail 12 can thereby be diverted via the first transverse bar 100, the step 120, the spindle 20 and the spindle nut 30 to the second seat rail 14.

The rotary bearing 40 supporting the rear end portion 20b of the spindle 20 is preferably a second transverse bar 140. The second transverse bar 140 has a bearing opening 142 for receiving a bearing bushing 144. The bearing bushing 144 is preferably fixed in a rotationally secured manner in the bearing opening 142. The bearing bushing 144 is preferably manufactured from a plastic. A further step 146 is arranged on the rear end portion 20b of the spindle 20. According to the preferred exemplary embodiment illustrated, the further step 146 is a stepped nut 146 which can be screwed onto the external thread of the spindle 20 and has an internal thread co-operating with the external thread of the spindle 20. The further step 146 is described in general below with reference to the stepped nut 146 which is illustrated. The stepped nut 146 is screwed onto the spindle 20 and secured against rotation. The stepped nut 146 is mounted rotatably by means of a cylindrical first portion 146a in the bearing bushing 144. The stepped nut 146 furthermore has a second portion 146b which is radially enlarged in relation to the first portion 146a and is spaced apart from the second transverse bar 140, in particular with a gap 152 being formed.

By a predetermined action of force, as occurs, for example, in the event of a rear impact, being exceeded, the first seat rail 12 is displaced rearward relative to the spindle 20 in such a manner that the first seat rail 12 first of all carries along the second transverse bar 140, which is fixed thereon, in its movement counter to the longitudinal direction x until the gap 152 between the second transverse bar 140 or the bearing bushing 144 and the second portion 146b of the stepped nut 146 is closed by contact between the second transverse bar 140 or the bearing bushing 144 and the second portion 146b of the stepped nut 146. Subsequently, the second transverse bar 140 is deformed in its connecting region to the first seat rail 12 in such a manner that the gap 150 between the second transverse bar 140 and the front edge of the second slot 12b closes by the front edge, as viewed in the longitudinal direction x, of the second slot 12b entering into contact with the second transverse bar 140. In this manner, in reaction to a predetermined action of force, in particular in the event of a rear impact, the second transverse bar 140 is clamped between the first seat rail 12 and the second portion 146b of the stepped nut 146, in particular by displacement of the first seat rail 12 to the rear relative to the spindle 20 because of deformation, and a force from the first seat rail 12 can thereby be diverted via the second transverse bar 140, the stepped nut 146, the spindle 20 and the spindle nut 30 to the second seat rail 14.

Figure 9:
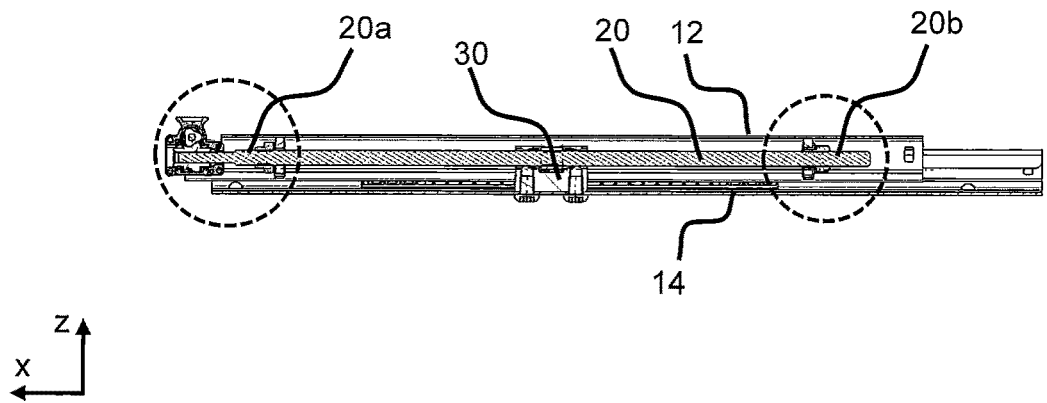

FIG. 9 shows a longitudinal section of the pair of rails from FIG. 3. FIGS. 10 and 11 respectively show an enlarged view of a front and rear portion of the pair of rails in the region of a front end portion 20a and a rear end portion 20b of the spindle 20 from FIG. 9. The first and/or second transverse bar 100, 140 is preferably accommodated with play parallel to the longitudinal direction x in the respective first or second slot 12a, 12b of the first seat rail 12. In a corresponding manner, a gap 110 is preferably formed between the first transverse bar 100 and the edges of the first slot 12a of the first seat rail 12. Furthermore, a gap 150 is preferably formed between the second transverse bar 140 and the edges of the second slot 12b of the first seat rail 12.

Figure 12:
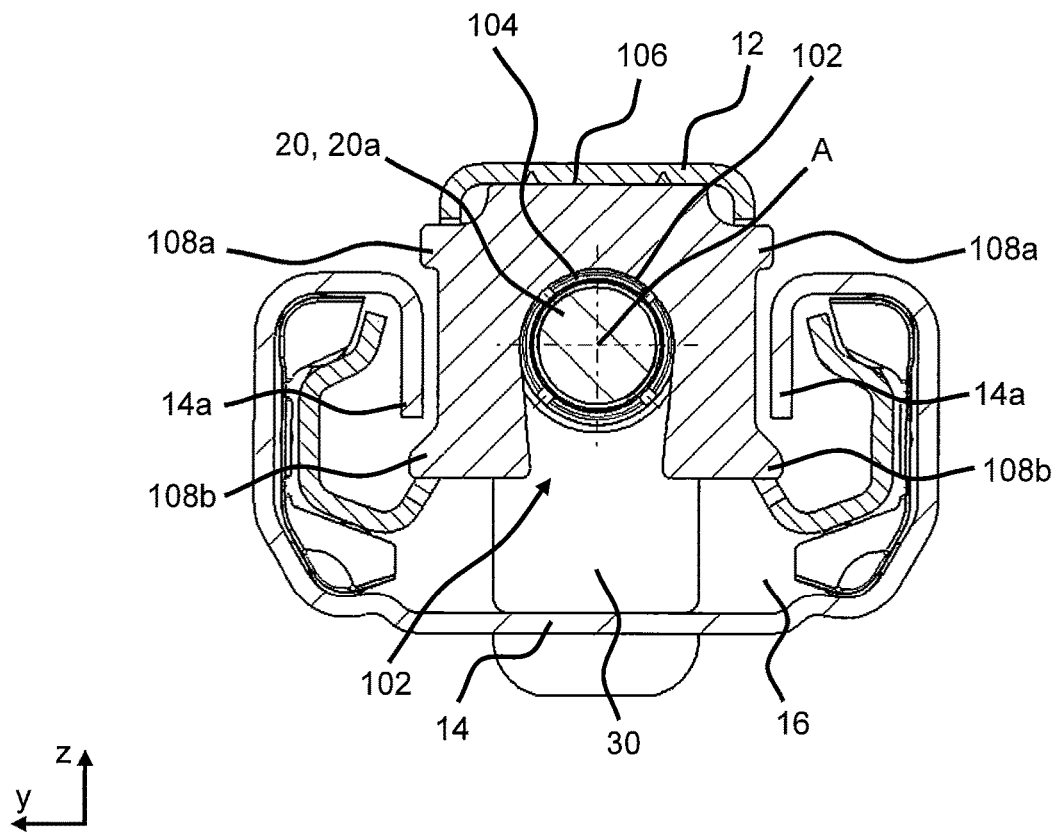
Figure 13:
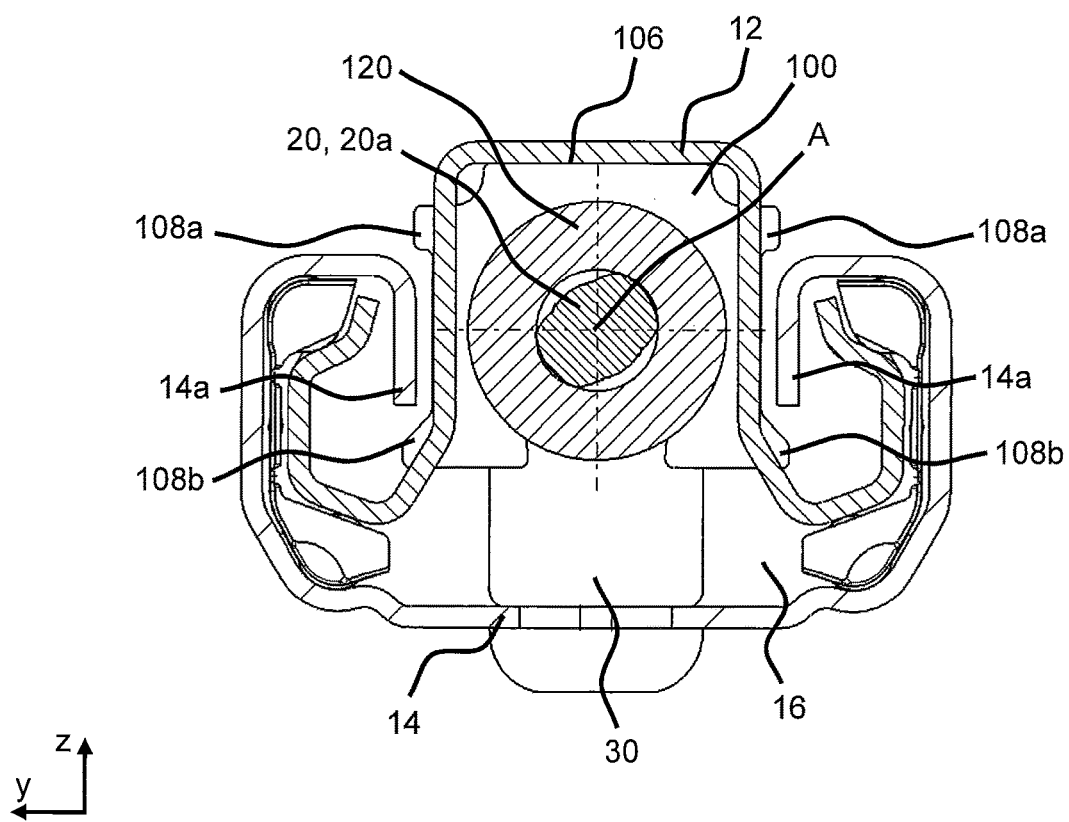

FIG. 12 shows an illustration of a cross section of the pair of rails from FIG. 3 through the first transverse bar 100. FIG. 13 shows an illustration of a cross section of the pair of rails from FIG. 3 through the step 120.

The first transverse bar 100 is fastened here at a contact surface 106 which is directed upward in the vertical direction z to the first seat rail 12, preferably by means of projection welding. The second transverse bar 140 can be fastened in the same manner to the first seat rail 12. The first transverse bar 100 has a downwardly open opening 102. In the region of a lower edge of the first transverse bar 100, the opening 102 has a width which assists introduction of the spindle 20. In the region of the spindle axis A of the spindle 20 in the mounted state, the opening 102 has a larger diameter than in the region of the lower edge of the transverse bar 100. Size details by way of example are, for example, that the spindle 20 has a diameter of 8 mm, the opening 102 in the region of the edge of the transverse bar 100 has a width of 9 mm and the opening 102 in the region of the spindle axis A of the mounted spindle 20 has a diameter of 10 mm. For example, a uniformly encircling gap 104 with a gap width of 1 mm is provided here around the spindle 20 having the diameter of 8 mm.

The transverse bars 100, 140 each have two upper projections 108a, 148a and two lower projections 108b, 148b which project laterally out of the corresponding slot 12a, 12b of the first seat rail 12 parallel to the transverse direction y. The projections 108a, 108b, 148a, 148b of the transverse bars 100, 140, which projections project out of the respective slot 12a, 12b of the first seat rail 12, are preferably spaced apart from the second seat rail 14 at least during normal operation.

However, in the event of loading of the first seat rail 12 upward in the vertical direction z, the lower projections 108b, 148b can come into contact with the second seat rail 14, in particular with a portion 14a of the second seat rail 14 that engages behind the first seat rail 12. In order to avoid the transverse bars 100, 140 interlocking here with the portion 14a of the second seat rail 14, the lower projections 108b, 148b of the transverse bars 100, 140 have a geometry by means of which the portions 14a of the second seat rail 14 can be conducted past the projections 108b, 148b.

The features which are disclosed in the above description, the claims and the drawings may be of significance both individually and in combination for implementing the invention in its various refinements.

Although the invention has been described in detail in the drawings and the preceding description, the descriptions should be understood as being illustrative and exemplary and not restrictive. In particular, the choice of the graphically illustrated proportions of the individual elements should not be interpreted as required or restrictive. Furthermore, the invention is in particular not restricted to the exemplary embodiments explained. Further variants of the invention and the implementation thereof are apparent to a person skilled in the art from the preceding disclosure, the figures and the claims.

Terms such as "comprise", "have", "include", "contain" and the like which are used in the claims do not rule out further elements or steps. The use of the indefinite article does not rule out a plural. A single device can carry out the functions of a plurality of units or devices mentioned in the claims.

LIST OF REFERENCE SIGNS

1 Vehicle seat
2 Seat part
4 Backrest
10 Longitudinal adjuster
12 First seat rail
12a First slot
12b Second slot
14 Second seat rail
14a Portion
16 Inner channel
20 Spindle
20a Front end portion (of the spindle 20)
20b Rear end portion (of the spindle 20)
30 Spindle nut
40 Rotary bearing
50 Gearing
60 Motor
70 Motor carrier
100 First transverse bar
102 Opening
104 Gap (radially with respect to the spindle 20)
106 Contact surface
108a Upper projection
108b Lower projection
110 Gap (with respect to the first slot 12a)
112 Gap (with respect to the step 120)
120 Step, nut
140 Second transverse bar
142 Bearing opening
144 Bearing bushing
146 Further step, stepped nut
146a First portion (of the stepped nut 146)
146b Second portion (of the stepped nut 146)
148a Upper projection
148b Lower projection
150 Gap (with respect to the second slot 12b)
152 Gap (with respect to the second portion 146b of the stepped nut 146)
A Spindle axis (of the spindle 20)
x Longitudinal direction
y Transverse direction
z Vertical direction

The invention claimed is:

1. A longitudinal adjuster for a vehicle seat, the longitudinal adjuster having at least one pair of rails which is formed from a first seat rail and a second seat rail which is displaceable in the longitudinal direction relative to the first seat rail, wherein the seat rails mutually engage around each other so as to form an inner channel, wherein a spindle nut mounted with the second seat rail and a spindle operatively connected to the spindle nut are arranged in the inner channel, wherein a gearing which can be driven via a motor and interacts with the spindle is arranged at a front end of the first seat rail, wherein the spindle is radially fixed at a front end portion of the spindle in the gearing and radially fixed at a rear end portion of the spindle in a rotary bearing of the first seat rail,
wherein a first transverse bar is accommodated in a slot of the first seat rail upstream of the spindle nut in the longitudinal direction, wherein the spindle is guided through an opening of the first transverse bar in a contact-free manner, including with an encircling gap being formed, wherein a step of the spindle is arranged spaced apart forward in the longitudinal direction with respect to the first transverse bar, wherein, in reaction to a predetermined action of force including displacement of the first seat rail, the first transverse bar is clamped between the first seat rail and the step and a force from the first seat rail can thereby be diverted via the first transverse bar, the step, the spindle and the spindle nut to the second seat rail.

2. The longitudinal adjuster as claimed in claim 1, wherein the rotary bearing supporting the rear end portion of the spindle is a second transverse bar.

3. The longitudinal adjuster as claimed in claim 2, wherein the second transverse bar has a bearing opening for receiving a bearing bushing.

4. The longitudinal adjuster as claimed in claim 3, wherein a further step is arranged on the rear end portion of the spindle, which step is mounted rotatably via a cylindrical first portion in a bearing bushing and is spaced apart by a radially enlarged second portion from the second transverse bar.

5. The longitudinal adjuster as claimed in claim 3, wherein, in reaction to a predetermined action of force the second transverse bar is clamped between the first seat rail and the second portion of the further step, including by displacement of the first seat rail rearward relative to the spindle, and a force from the first seat rail can thereby be diverted via the second transverse bar, the further step, the spindle and the spindle nut to the second seat rail.

6. The longitudinal adjuster as claimed in claim 1, wherein at least one of the transverse bars is of flat configuration.

7. The longitudinal adjuster as claimed in claim 1, wherein at least one of the transverse bars is fastened at a contact surface which is directed upward in the vertical direction to the first seat rail, including via projection welding.

8. The longitudinal adjuster as claimed in claim 1, wherein at least one of the transverse bars is accommodated with play parallel to the longitudinal direction in the respective slot of the first seat rail.

9. The longitudinal adjuster as claimed in claim 1, wherein at least one of the transverse bars has projections which project laterally out of the respective slot of the first seat rail parallel to the transverse direction.

* * * * *